(12) United States Patent
Calidas et al.

(10) Patent No.: US 11,145,024 B2
(45) Date of Patent: Oct. 12, 2021

(54) ADAPTIVE DISPATCH FOR ACCELERATION OF DEEP NEURAL NETWORKS ON GRAPHIC PROCESSING UNITS

(71) Applicant: QUALCOMM Incorporated, San Diego, CA (US)

(72) Inventors: Balaji Calidas, San Diego, CA (US); Joshua Walter Kelly, San Diego, CA (US); Avinash Seetharamaiah, San Diego, CA (US); Jonnala Gadda Nagendra Kumar, San Diego, CA (US); Hitendra Mohan Gangani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 16/728,591

(22) Filed: Dec. 27, 2019

(65) Prior Publication Data

US 2021/0201433 A1 Jul. 1, 2021

(51) Int. Cl.
| | |
|---|---|
| *G06T 1/20* | (2006.01) |
| *G06T 15/00* | (2011.01) |
| *G06N 20/00* | (2019.01) |
| *G06F 9/38* | (2018.01) |
| *G06N 3/08* | (2006.01) |
| *G06F 9/48* | (2006.01) |

(52) U.S. Cl.
CPC .............. *G06T 1/20* (2013.01); *G06F 9/3802* (2013.01); *G06F 9/4843* (2013.01); *G06N 3/08* (2013.01); *G06N 20/00* (2019.01); *G06T 15/005* (2013.01)

(58) Field of Classification Search
CPC . G06N 3/08; G06N 20/00; G06T 1/20; G06T 15/005; G06F 9/3802; G06F 9/4843
USPC ......................................................... 345/501
See application file for complete search history.

(56) References Cited

U.S. PATENT DOCUMENTS

| | | | |
|---|---|---|---|
| 10,930,047 B2 * | 2/2021 | Potter | G06T 15/005 |
| 2009/0160867 A1 * | 6/2009 | Grossman | G06T 15/005 |
| | | | 345/522 |
| 2012/0159507 A1 * | 6/2012 | Kwon | G06F 9/5088 |
| | | | 718/104 |
| 2012/0200576 A1 * | 8/2012 | Hartog | G06F 9/526 |
| | | | 345/501 |

(Continued)

*Primary Examiner* — Jacinta M Crawford
(74) *Attorney, Agent, or Firm* — Campbell C. Chiang; Holland & Hart, LLP

(57) ABSTRACT

Methods, systems, and devices for processing are described. A device may parse a set of layers of a deep neural network. The set of layers may be associated with a set of machine learning operations of the deep neural network. The device may determine one or more layer parameters based on the determined set of layers. In some aspects, the device may determine an execution time associated with executing a shader dispatch based on the one or more layer parameters. The device may batch the shader dispatch to a command buffer based on the execution time and process the command buffer based on the batching. The device may determine a target execution time based on an assembly time associated with the command buffer, a processing time associated with the command buffer, a frequency level associated with processing the command buffer, the one or more layer parameters, or some combination thereof.

18 Claims, 11 Drawing Sheets

(56) References Cited

U.S. PATENT DOCUMENTS

| | | | |
|---|---|---|---|
| 2013/0212277 A1* | 8/2013 | Bodik | G06F 9/4887 709/226 |
| 2015/0363239 A1* | 12/2015 | Hsu | G06F 9/5044 718/104 |
| 2020/0026988 A1* | 1/2020 | Guo | G06K 9/6215 |

* cited by examiner

ADAPTIVE DISPATCH FOR ACCELERATION OF DEEP NEURAL NETWORKS ON GRAPHIC PROCESSING UNITS

BACKGROUND

The following relates generally to processing, and more specifically to adaptive dispatch for acceleration of neural networks on graphics processing units (GPUs).

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include entertainment systems, information systems, virtual reality systems, model and simulation systems, and so on. These systems may employ a combination of hardware and software technologies to support processing, storage, generation, manipulation and rendition of multimedia information, for example, such as capture devices, storage devices, communication networks, computer systems, and display devices.

For example, a GPU may represent one or more dedicated processors for performing graphical operations. A GPU may be a dedicated hardware unit having fixed function and programmable components for rendering graphics and executing GPU applications. In some cases, a GPU may implement a parallel processing structure that may provide for more efficient processing of complex graphic-related operations. For example, a GPU may include a plurality of processing elements that are configured to operate in a parallel manner, which may allow the GPU to generate graphic images for display (e.g., for graphical user interfaces, for display of two-dimensional or three-dimensional graphics scenes, etc.).

SUMMARY

The described techniques relate to improved methods, systems, devices, and apparatuses that support adaptive dispatch for acceleration of neural networks on graphics processing units (GPUs).

A method of processing at a device is described. The method may include parsing a set of layers of a deep neural network, where the set of layers is associated with a set of machine learning operations of the deep neural network, and determining one or more layer parameters based on the determined set of layers. The method may further include determining an execution time associated with executing a shader dispatch based on the one or more layer parameters, batching the shader dispatch to a command buffer based on the execution time, and processing the command buffer based on the batching.

An apparatus for processing at a device is described. The apparatus may include a processor, memory coupled with the processor, and instructions stored in the memory. The instructions may be executable by the processor to cause the apparatus to parse a set of layers of a deep neural network, where the set of layers is associated with a set of machine learning operations of the deep neural network, and determine one or more layer parameters based on the determined set of layers. The instructions may be executable by the processor to further cause the apparatus to determine an execution time associated with executing a shader dispatch based on the one or more layer parameters, batch the shader dispatch to a command buffer based on the execution time, and process the command buffer based on the batching.

Another apparatus for processing at a device is described. The apparatus may include means for parsing a set of layers of a deep neural network, where the set of layers is associated with a set of machine learning operations of the deep neural network, and determining one or more layer parameters based on the determined set of layers. The apparatus may further include means for determining an execution time associated with executing a shader dispatch based on the one or more layer parameters, batching the shader dispatch to a command buffer based on the execution time, and processing the command buffer based on the batching.

A non-transitory computer-readable medium storing code for processing at a device is described. The code may include instructions executable by a processor to parse a set of layers of a deep neural network, where the set of layers is associated with a set of machine learning operations of the deep neural network, and determine one or more layer parameters based on the determined set of layers. The code may include instructions further executable by a processor to determine an execution time associated with executing a shader dispatch based on the one or more layer parameters, batch the shader dispatch to a command buffer based on the execution time, and process the command buffer based on the batching.

Some examples of the method, apparatuses, and non-transitory computer-readable medium described herein may further include operations, features, means, or instructions for determining a target execution time based on an assembly time associated with the command buffer, a processing time associated with the command buffer, a frequency level associated with the processing of the command buffer, the one or more layer parameters, or some combination thereof. Some examples of the method, apparatuses, and non-transitory computer-readable medium described herein may further include operations, features, means, or instructions for inserting a flush marker into a shader sequence based on the target execution time and the determined execution time associated with the shader dispatch, where the shader dispatch may be batched to the command buffer based on the flush marker. In some examples of the method, apparatuses, and non-transitory computer-readable medium described herein, the shader dispatch may be batched to the command buffer based on the target execution time and the determined execution time associated with the shader dispatch.

Some examples of the method, apparatuses, and non-transitory computer-readable medium described herein may further include operations, features, means, or instructions for identifying a first layer of the set of layers based on the parsing, determining a shader sequence based on the identified first layer, and dispatching the shader sequence into a set of shader dispatches, where the set of shader dispatches includes the shader dispatch. Some examples of the method, apparatuses, and non-transitory computer-readable medium described herein may further include operations, features, means, or instructions for determining an accumulated execution time for the shader sequence based on at least one layer parameter associated with the first layer, where the shader sequence may be dispatched into the set of shader dispatches based on the accumulated execution time. In some examples of the method, apparatuses, and non-transitory computer-readable medium described herein, the shader sequence may be dispatched into the set of shader dispatches based on a target execution time for each shader dispatch of the set of shader dispatches.

In some examples of the method, apparatuses, and non-transitory computer-readable medium described herein, the one or more layer parameters include one or more tensor size parameters, one or more layer type parameters, one or more shader complexity parameters, or some combination thereof. Some examples of the method, apparatuses, and non-transitory computer-readable medium described herein may further include operations, features, means, or instructions for flushing the command buffer based on the processing of the command buffer. In some examples of the method, apparatuses, and non-transitory computer-readable medium described herein, the command buffer may be flushed based on a flush marker in a shader sequence associated with the shader dispatch, the determined execution time associated with the shader dispatch, or both. Some examples of the method, apparatuses, and non-transitory computer-readable medium described herein may further include operations, features, means, or instructions for determining an accumulated execution time for the set of machine learning operations, and determining the accumulated execution time exceeds a maximum execution time threshold, where the command buffer may be flushed based on the determination that the accumulated execution time exceeds the maximum execution time threshold.

DETAILED DESCRIPTION

Figure 1:
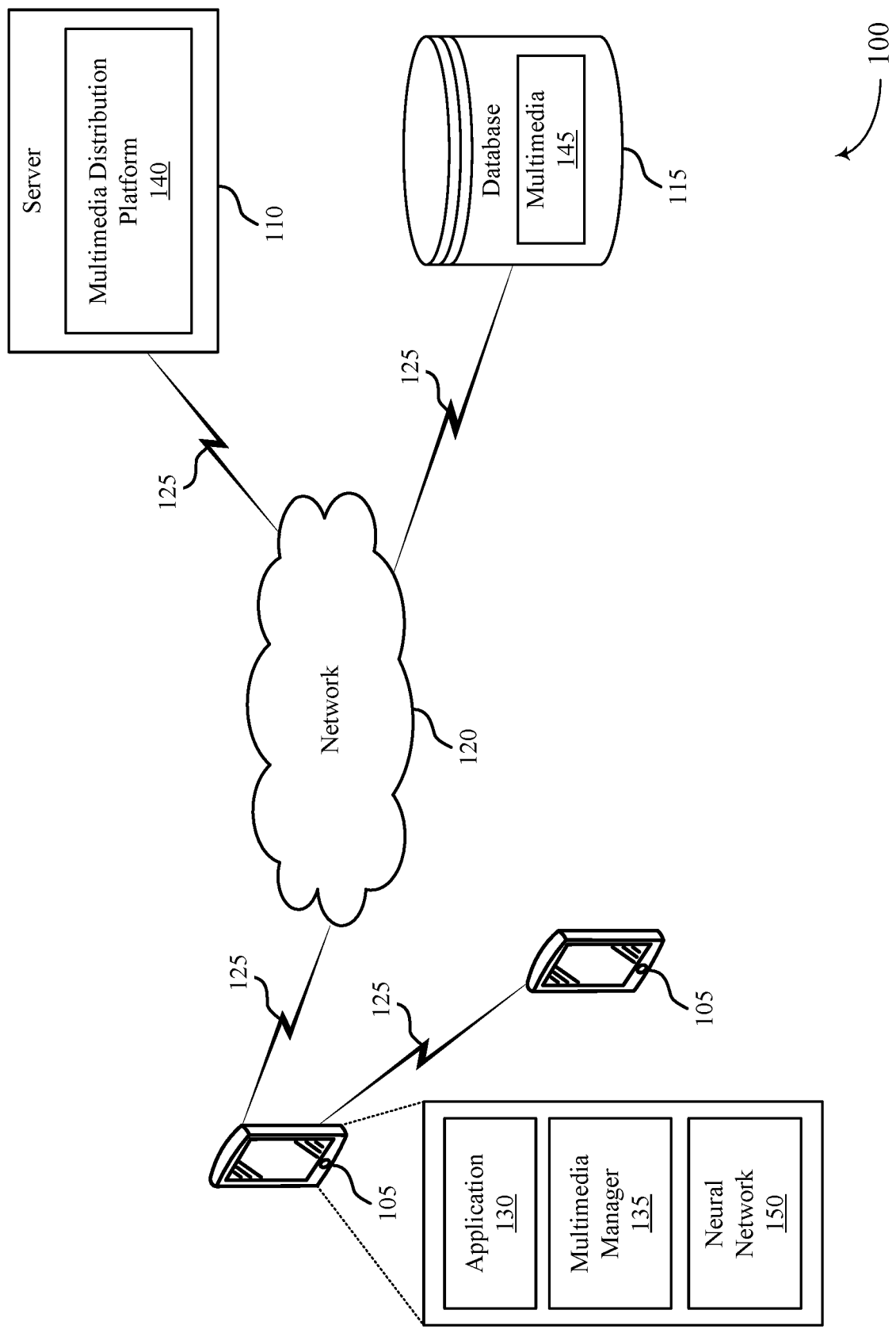
FIG. 1 illustrates an example of a system for processing that supports adaptive dispatch for acceleration of neural networks on graphics processing units (GPUs) in accordance with aspects of the present disclosure.

A neural network (e.g., a Deep Neural Network (DNN)) may be implemented by a graphics processing unit (GPU) to exploit parallel execution of shader programs. For example, a device or system may parse a set of layers of a deep neural network, where parsed layers may be associated with various machine learning operations of the neural network. In some cases, shader sequences may be generated for each layer, and a GPU may utilize parallel execution for processing of the shader sequences (e.g., the shader sequences may be assembled to a command buffer for processing by the GPU). To reduce idle periods where the GPU is waiting for the Central Processing Unit (CPU) to assemble a subsequent command buffer, efficient shader dispatch (e.g., shader sequencing and assembly into command buffers, as well as GPU execution of command buffers) may be desired. Conventional techniques for improving dispatch efficiency may include batching of shader dispatches (i.e., thread groups of a shader sequence) so as to balance the CPU time involved in assembling command buffers with the GPU time required to process them, which may reduce GPU idle periods. However, predicting execution time (e.g., at the driver level) for a given shader dispatch by looking at a global work size per dispatch may be unreliable as shader complexity is not taken into account. Other techniques may include buffer flushing every N dispatches, but such techniques may be unable to successfully accommodate for large differences in dispatch execution time (based on size and complexity).

According to the techniques described herein, GPU execution time for a shader dispatch may be calculated (e.g., or estimated) as the neural network is being parsed layer by layer at the framework level. For example, GPU execution time may be calculated for each layer (e.g., each parsed layer) in a machine learning model based on layer parameters, such as the machine learning operation associated with the layer, the complexity of a shader backing the machine learning operation, and the sizes of tensors attached to the layer, etc. Accordingly, the framework backend of the neural network responsible for generating GPU code may adaptively determine shader batch sizes and appropriately insert flush markers into the shader sequence based on calculated GPU execution times (e.g., such that the command processor may flush shader dispatch buffer in accordance with the flush markers for improved buffer flushing, dispatch assembly, etc.). In some aspects, the shader dispatch buffer may also be referred to herein as a command buffer.

For example, a shader sequence associated with a parsed layer may be dispatched (e.g., by a CPU) to a command processor (e.g., for processing by a GPU) based on a determined execution time for each shader dispatch and a target execution time for each shader dispatch. The target execution time for each dispatch may be determined based on a CPU assembly time associated with the command buffer and a GPU processing time associated with the command buffer (e.g., such that the GPU processing time is optimized towards the CPU assembly time). As such, the framework backend of the neural network responsible for generating GPU code may determine or estimate execution time associated with a shader dispatch based on layer parameters such as the machine learning operations, shader complexity parameters, tensor size parameters, etc. The framework backend of the neural network responsible for generating GPU code may then batch shader dispatches to the command processor (e.g., adaptively determine shader batch sizes) based on determined execution times and the target execution time (e.g., such that shader dispatches are batched to the command processor such that each shader dispatch may be processed within a threshold of the target execution time for each shader dispatch). Such may provide for improved batching of shader dispatches (i.e., thread groups) so as to balance the CPU time involved in assembling command buffers with the GPU time required to process them (e.g., which may reduce GPU idle time, processing latency, etc.).

Aspects of the disclosure are initially described in the context of a multimedia system. An example dispatch model, an example dispatch sequence, and an example machine learning framework illustrating aspects of the discussed techniques are then described. Aspects of the disclosure are further illustrated by and described with reference to apparatus diagrams, system diagrams, and flowcharts that relate to adaptive dispatch for acceleration of neural networks on GPUs.

FIG. 1 illustrates a multimedia system 100 for a device that supports adaptive dispatch for acceleration of neural networks on GPUs in accordance with aspects of the present disclosure. The multimedia system 100 may include devices 105, a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports adaptive dispatch for acceleration of neural networks on GPUs, such as multimedia packets, multimedia data, or multimedia control information, via network 120 using communications links 125. In some cases, a portion or all of the techniques described herein supporting adaptive dispatch for acceleration of neural networks on GPUs may be performed by the devices 105 or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130 and a multimedia manager 135. While, the multimedia system 100 illustrates the devices 105 including both the application 130 and the multimedia manager 135, the application 130 and the multimedia manager 135 may be an optional feature for the devices 105. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The device 105 may include a neural network 150. The neural network 150 may be implemented by aspects of a processor, for example, such as CPU 210 described in FIG. 2, CPU 610 described in FIG. 6, or CPU 710 described in FIG. 7, or CPU 940 described in FIG. 9. The neural network 150 may include a machine learning network (e.g., a neural network, a deep neural network, a convolutional neural network, a trained neural network, etc.). For example, the neural network 150 may include or refer to a set of instructions and/or hardware (e.g., modeled loosely after the human brain) that are designed to recognize patterns. In some examples, the neural network 150 may interpret sensory data through a kind of machine perception, labeling or clustering raw input.

The multimedia manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the multimedia manager 135 may process multimedia (e.g., image data, video data, audio data) from and/or write multimedia data to a local memory of the device 105 or to the database 115.

The multimedia manager 135 may also be configured to provide multimedia enhancements, multimedia restoration, multimedia analysis, multimedia compression, multimedia streaming, and multimedia synthesis, among other functionality. For example, the multimedia manager 135 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the multimedia manager 135 may process multimedia data to support adaptive dispatch for acceleration of neural networks on GPUs, according to the techniques described herein.

The server 110 may be a data server, a cloud server, a server associated with an multimedia subscription provider, proxy server, web server, application server, communications server, home server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device may support adaptive dispatch for acceleration of neural networks on GPUs associated with the multimedia 145. The device 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, and/or downlink transmissions, from the server 110 and the database 115 to the device 105. The wireless communications links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

According to examples of aspects described herein, the device 105 may parse a set of layers of a deep neural network. The set of layers may be associated with a set of machine learning operations of the deep neural network. The device 105 may determine one or more layer parameters based on the determined set of layers. In some aspects, the device 105 may determine an execution time associated with executing a shader dispatch based on the one or more layer parameters. The device 105 may batch the shader dispatch to a command buffer based on the execution time and process the command buffer based on the batching.

The techniques described herein may provide improvements in adaptive dispatch for acceleration of neural networks on GPUs. Furthermore, the techniques described herein may provide benefits and enhancements to the operation of the devices 105. For example, by parsing layers of a deep neural network and executing a shader dispatch based on layer parameters of the deep neural network, dispatch efficiency may be improved, and the operational characteristics, such as power consumption, processor utilization (e.g., DSP, CPU, GPU, ISP processing utilization), and memory usage of the devices 105 may be reduced. The techniques described herein for providing dispatch efficiency to the devices 105 may reduce latency (e.g., GPU idle periods) associated with processes related to batching shader dispatches, reduce latency associated with lag from differences in CPU command buffer assembly time and GPU command buffer processing time, etc.

Figure 2:
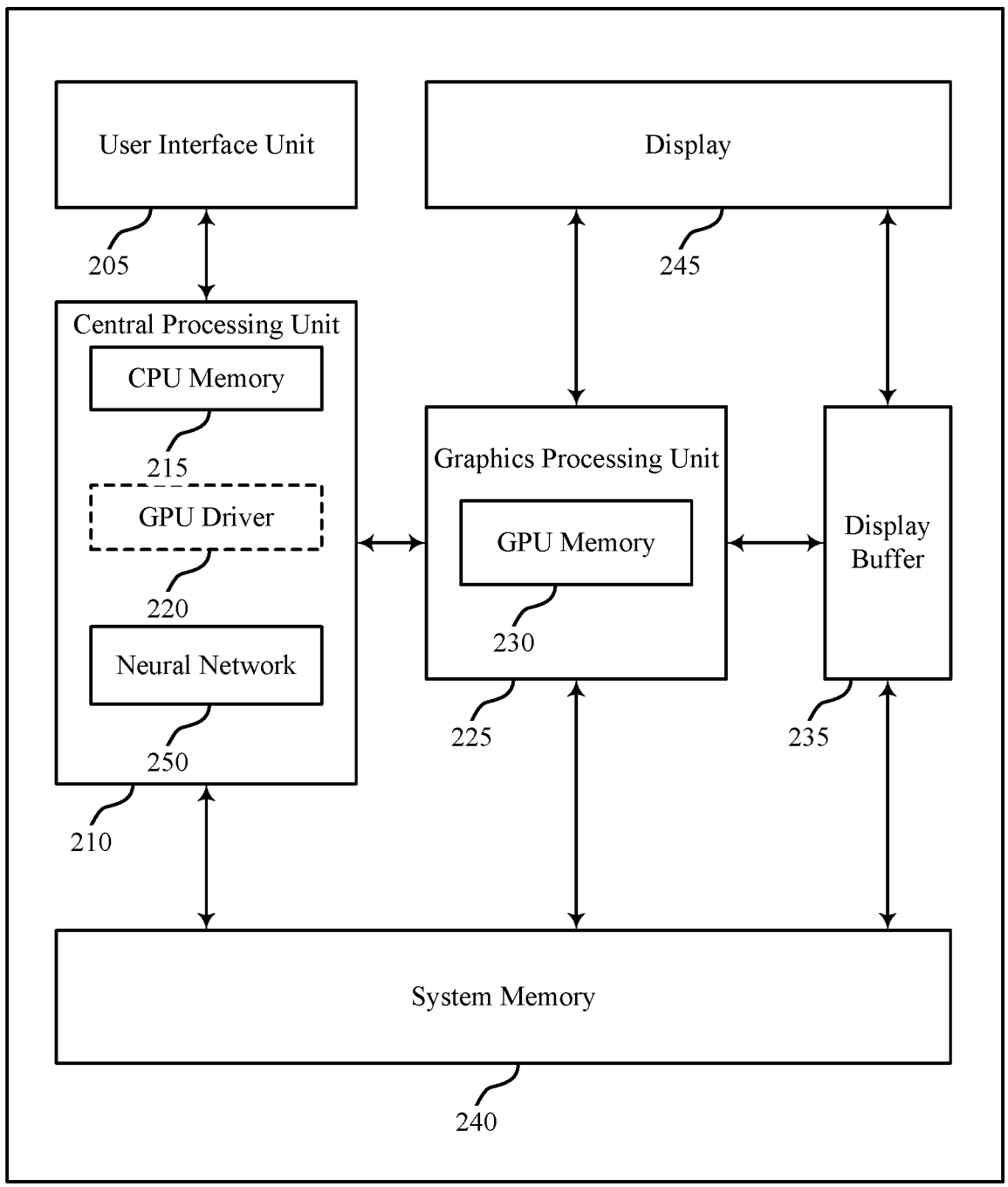
FIG. 2 illustrates an example of a device that supports adaptive dispatch for acceleration of neural networks on GPUs in accordance with aspects of the present disclosure.

FIG. 2 illustrates an example of a device 200 in accordance with various aspects of the present disclosure. In some cases, device 200 may implement aspects of adaptive dispatch for acceleration of neural networks on GPUs performed by a device 105 as described with reference to FIG. 1. Examples of device 200 include, but are not limited to, wireless devices, mobile or cellular telephones, including smartphones, personal digital assistants (PDAs), video gaming consoles that include video displays, mobile video gaming devices, mobile video conferencing units, laptop computers, desktop computers, televisions set-top boxes, tablet computing devices, e-book readers, fixed or mobile media players, and the like.

In the example of FIG. 2, device 200 includes a central processing unit (CPU) 210 having CPU memory 215, a GPU 225 having GPU memory 230, a display 245, a display buffer 235 storing data associated with rendering, a user interface unit 205, and a system memory 240. For example, system memory 240 may store a GPU driver 220 (illustrated as being contained within CPU 210 as described herein) having a compiler, a GPU program, a locally-compiled GPU program, and the like. User interface unit 205, CPU 210, GPU 225, system memory 240, and display 245 may communicate with each other (e.g., using a system bus).

In some examples, CPU 210 may include a neural network 250. In some cases, the neural network 250 may be implemented elsewhere in device 200. The neural network 250 may be an example of aspects of the neural network 150 described herein. The neural network 250 may include a machine learning network (e.g., a neural network, a deep neural network, a convolutional neural network, a trained neural network, etc.). In some examples, the neural network 250 may be a deep neural network including one or more layers (e.g., neural network layers, convolution layers). In some examples, the neural network 250 may receive one or more input signals at an input layer or a first layer and provide output signals via an output layer or a last layer. The neural network 250 may process the one or more input signals, for example, utilizing one or more intermediate layers (e.g., one or more intermediate hidden layers). In some examples, each of the layers of the neural network 250 may include one or more nodes (e.g., one or more neurons) arranged therein and may provide one or more functions.

The neural network 250 may also include connections (e.g., edges, paths) between the one or more nodes included in adjacent layers. Each of the connections may have an associated weight (e.g., a weighting factor, a weighting coefficient). The weights, for example, may be assignable by the neural network 250. In some examples, the device 200 may train and implement the neural network 250 at various processing stages to provide processing improvements related to adaptive dispatch for acceleration of neural networks on GPUs in accordance with aspects of the present disclosure. In some examples, the device 200 may implement the neural network 250 based on shader sequences and shader dispatches associated with the shader sequences (e.g., as described in more detail herein). In some examples, the device 200 may train the neural network 250 based on shader sequences and shader dispatches associated with the shader sequences. In some aspects, the device 200 may train the neural network 250 based on batching of the shader batches to command buffers. In some example aspects, the device 200 may train the neural network 250 based on flushing of the command buffers (e.g., based on the insertion of flush markers associated with flushing the command buffers).

Examples of CPU 210 include, but are not limited to, a digital signal processor (DSP), general purpose microprocessor, ASIC, an FPGA, or other equivalent integrated or discrete logic circuitry. Although CPU 210 and GPU 225 are illustrated as separate units in the example of FIG. 2, in some examples, CPU 210 and GPU 225 may be integrated into a single unit. CPU 210 may execute one or more software applications. Examples of the applications may include operating systems, word processors, web browsers, e-mail applications, spreadsheets, video games, audio and/or video capture, playback or editing applications, or other such applications that initiate the generation of image data to be presented via display 245. As illustrated, CPU 210 may include CPU memory 215. For example, CPU memory 215 may represent on-chip storage or memory used in executing machine or object code. CPU memory 215 may include one or more volatile or non-volatile memories or storage devices, such as flash memory, a magnetic data media, an optical storage media, etc. CPU 210 may be able to read values from or write values to CPU memory 215 more quickly than reading values from or writing values to system memory 240, which may be accessed, e.g., over a system bus.

GPU 225 may represent one or more dedicated processors for performing graphical operations. That is, for example, GPU 225 may be a dedicated hardware unit having fixed function and programmable components for rendering graphics and executing GPU applications. GPU 225 may also include a DSP, a general purpose microprocessor, an ASIC, an FPGA, or other equivalent integrated or discrete logic circuitry. GPU 225 may be built with a highly-parallel structure that provides more efficient processing of complex graphic-related operations than CPU 210. For example, GPU 225 may include a plurality of processing elements that are configured to operate on multiple vertices or pixels in a parallel manner. The highly parallel nature of GPU 225 may allow GPU 225 to generate graphic images (e.g., graphical user interfaces and two-dimensional or three-dimensional graphics scenes) for display 245 more quickly than CPU 210.

GPU 225 may, in some instances, be integrated into a motherboard of device 200. In other instances, GPU 225 may be present on a graphics card that is installed in a port in the motherboard of device 200 or may be otherwise incorporated within a peripheral device configured to interoperate with device 200. As illustrated, GPU 225 may include GPU memory 230. For example, GPU memory 230 may represent on-chip storage or memory used in executing machine or object code. GPU memory 230 may include one or more volatile or non-volatile memories or storage devices, such as flash memory, a magnetic data media, an optical storage media, etc. GPU 225 may be able to read values from or write values to GPU memory 230 more quickly than reading values from or writing values to system memory 240, which may be accessed, e.g., over a system bus. That is, GPU 225 may read data from and write data to GPU memory 230 without using the system bus to access off-chip memory. This operation may allow GPU 225 to operate in a more efficient manner by reducing the need for GPU 225 to read and write data via the system bus, which may experience heavy bus traffic.

Display 245 represents a unit capable of displaying video, images, text or any other type of data for consumption by a viewer. Display 245 may include a liquid-crystal display (LCD), a light emitting diode (LED) display, an organic LED (OLED), an active-matrix OLED (AMOLED), or the like. Display buffer 235 represents a memory or storage device dedicated to storing data for presentation of imagery, such as computer-generated graphics, still images, video frames, or the like for display 245. Display buffer 235 may represent a two-dimensional buffer that includes a plurality of storage locations. The number of storage locations within display buffer 235 may, in some cases, generally correspond to the number of pixels to be displayed on display 245. For example, if display 245 is configured to include 640×480 pixels, display buffer 235 may include 640×480 storage locations storing pixel color and intensity information, such as red, green, and blue pixel values, or other color values. Display buffer 235 may store the final pixel values for each of the pixels processed by GPU 225. Display 245 may retrieve the final pixel values from display buffer 235 and display the final image based on the pixel values stored in display buffer 235.

User interface unit 205 represents a unit with which a user may interact with or otherwise interface to communicate with other units of device 200, such as CPU 210. Examples of user interface unit 205 include, but are not limited to, a trackball, a mouse, a keyboard, and other types of input devices. User interface unit 205 may also be, or include, a touch screen and the touch screen may be incorporated as part of display 245. In some cases, user interface unit 205 may be an example of I/O controller 915 as described with reference to FIG. 9.

System memory 240 may comprise one or more computer-readable storage media. Examples of system memory 240 include, but are not limited to, a random access memory (RAM), static RAM (SRAM), dynamic RAM (DRAM), a read-only memory (ROM), an electrically erasable programmable read-only memory (EEPROM), a compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor. System memory 240 may store program modules and/or instructions that are accessible for execution by CPU 210. Additionally, system memory 240 may store user applications and application surface data associated with the applications. System memory 240 may in some cases store information for use by and/or information generated by other components of device 200. For example, system memory 240 may act as a device memory for GPU 225 and may store data to be operated on by GPU 225 as well as data resulting from operations performed by GPU 225.

In some examples, system memory 240 may include instructions that cause CPU 210 or GPU 225 to perform the functions ascribed to CPU 210 or GPU 225 in aspects of the present disclosure. System memory 240 may, in some examples, be considered as a non-transitory storage medium. The term "non-transitory" should not be interpreted to mean that system memory 240 is non-movable. As one example, system memory 240 may be removed from device 200 and moved to another device. As another example, a system memory substantially similar to system memory 240 may be inserted into device 200. In certain examples, a non-transitory storage medium may store data that can, over time, change (e.g., in RAM).

System memory 240 may store a GPU driver 220 and compiler, a GPU program, and a locally-compiled GPU program. The GPU driver 220 may represent a computer program or executable code that provides an interface to access GPU 225. CPU 210 may execute the GPU driver 220 or portions thereof to interface with GPU 225 and, for this reason, GPU driver 220 is shown in the example of FIG. 2 within CPU 210. GPU driver 220 may be accessible to programs or other executables executed by CPU 210, including the GPU program stored in system memory 240. Thus, when one of the software applications executing on CPU 210 requires graphics processing, CPU 210 may provide graphics commands and graphics data to GPU 225 for rendering to display 245 (e.g., via GPU driver 220).

In some cases, the GPU program may include code written in a high level (HL) programming language, e.g., using an application programming interface (API). Examples of APIs include Open Graphics Library ("OpenGL"), DirectX, Render-Man, WebGL, or any other public or proprietary standard graphics API. The instructions may also conform to so-called heterogeneous computing libraries, such as Open-Computing Language ("OpenCL"), DirectCompute, etc. In general, an API includes a predetermined, standardized set of commands that are executed by associated hardware. API commands allow a user to instruct hardware components of a GPU 225 to execute commands without user knowledge as to the specifics of the hardware components. In order to process the graphics rendering instructions, CPU 210 may issue one or more rendering commands to GPU 225 (e.g., through GPU driver 220) to cause GPU 225 to perform some or all of the rendering of the graphics data. In some examples, the graphics data to be rendered may include a list of graphics primitives (e.g., points, lines, triangles, quadrilaterals, etc.).

The GPU program stored in system memory 240 may invoke or otherwise include one or more functions provided by GPU driver 220. CPU 210 generally executes the program in which the GPU program is embedded and, upon encountering the GPU program, passes the GPU program to GPU driver 220. CPU 210 executes GPU driver 220 in this context to process the GPU program. That is, for example, GPU driver 220 may process the GPU program by compiling the GPU program into object or machine code executable by GPU 225. This object code may be referred to as a locally-compiled GPU program. In some examples, a compiler associated with GPU driver 220 may operate in real-time or near-real-time to compile the GPU program during the execution of the program in which the GPU program is embedded. For example, the compiler generally represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, but not limited to, CPU 210 and GPU 225).

Figure 3A:
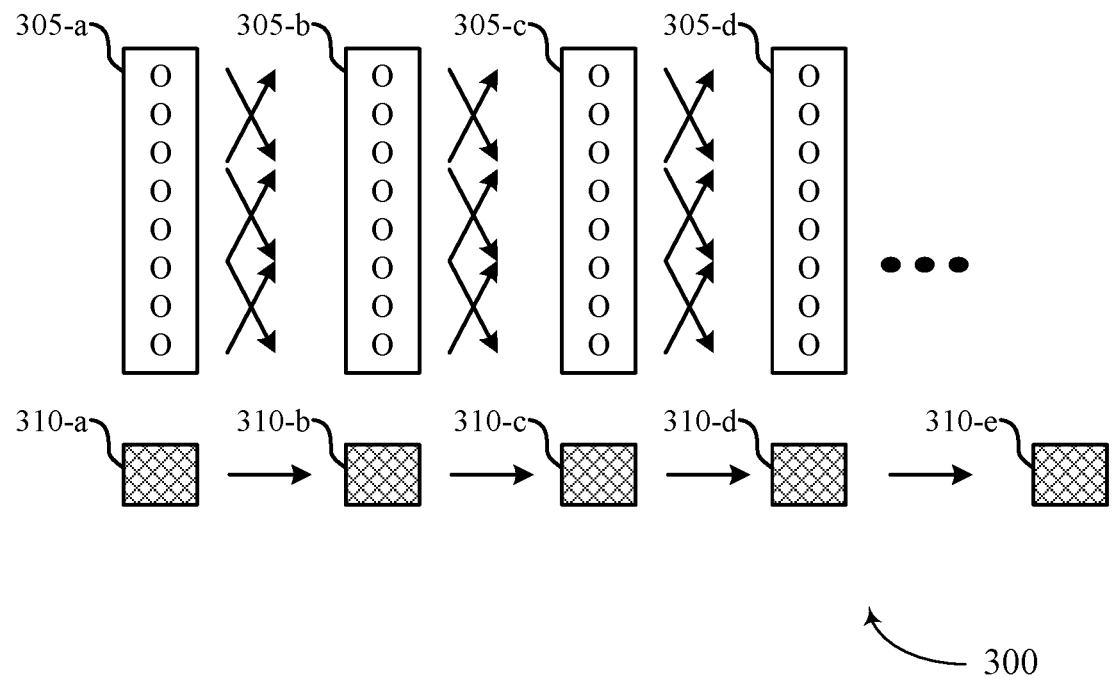
FIG. 3A illustrates example of a dispatch model for a neural network that supports adaptive dispatch for acceleration of neural networks on GPUs in accordance with aspects of the present disclosure.
Figure 3B:
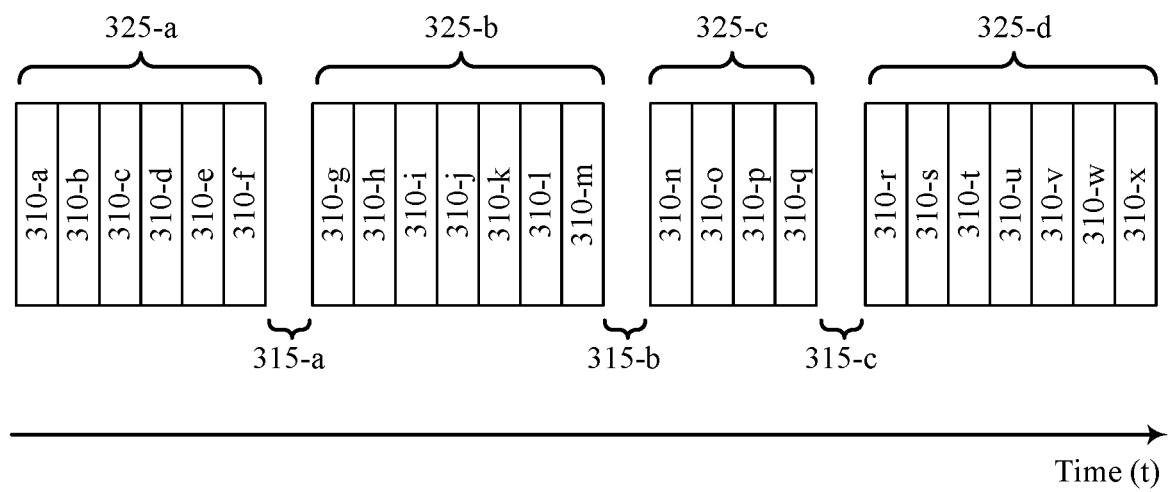
FIG. 3B illustrates an example dispatch sequence that supports adaptive dispatch for acceleration of neural networks on GPUs in accordance with aspects of the present disclosure.

FIG. 3A illustrates example dispatch model 300 for a neural network that supports adaptive dispatch for acceleration of neural networks on GPUs in accordance with aspects of the present disclosure. FIG. 3B illustrates an example dispatch sequence 301 that supports adaptive dispatch for acceleration of neural networks on GPUs in accordance with aspects of the present disclosure. In some examples, the dispatch model 300 and dispatch sequence 301 may implement aspects of multimedia system 100.

The dispatch model 300 of FIG. 3A may include a framework backend of a neural network. The neural network of the dispatch may be, for example, a deep neural network. In some aspects, the neural network may be an example of aspects of a neural network 150 of a device 105 (or of a neural network 250 of a device 200) as described herein. Referring to FIG. 3A, the neural network may include layers 305 (e.g., layers 305-a through 305-d). Each of the layers 305-a through 305-d may correspond to one or more operations (e.g., machine learning operations) of the neural network.

In some example aspects, the device 105 (e.g., the framework backend of the neural network of the device 105) may parse one or more of the layers 305-a through 305-d for operations (e.g., machine learning operations) of the neural network. Based on the parsing, the device 105 (e.g., the framework backend) may generate GPU code for implementation of the neural network. In some aspects, the GPU code may include shader sequences 310. For example, the device 105 may parse machine learning operations or layer parameters of each of layers 305-a through 305-d, where layers 305-a through 305-d may each be implemented by a shader sequence 310 (e.g., layers 305-a through 305-d may be implemented by shader sequences 310-a through 310-d, respectively). As such, shader sequences 310-a through 310-d (e.g., and additional shader sequences 310 for any additional layers 305 of the DNN) may be dispatched to a command buffer based on the parsing of respective layers (e.g., layer parameters or machine learning operations associated with respective layers 305, such that CPU command buffer assembly and GPU execution may be balanced within some threshold).

In an example, the device may generate GPU code (e.g., a shader sequence) for each of the layers 305-a through 305-d. For example, the device 105 may generate shader sequences 310-a through 310-d respectively corresponding to the layers 305-a through 305-d. In some examples, the device 105 may generate a shader sequence 310-e based on a layer following layer 305-d. As described herein, the device 105 may leverage parallel processing of a GPU, or parallel execution of shader sequences 310-a through 310-d, for efficient implementation of the neural network. Generally, the techniques described herein may be implemented for any number of parsed layers 305, and number of shader sequences 310, etc., by analogy, without departing from the scope of the present disclosure.

The device 105 (e.g., a framework backend of a neural network as described herein) may determine layer parameters of one or more layers of the neural network. For example, the device 105 may determine layer parameters of the layers 305-a through 305-d (e.g., based on the complexity or type of machine learning operations associated with or implemented by each layer, based on how the device 105 chooses to parse the layers 305, etc.). The layer parameters may include, for example, machine learning operations, tensor size parameters, layer type parameters, shader complexity parameters, or a combination thereof.

The dispatch sequence 301 of FIG. 3B illustrates an example of shader sequences assembled (e.g., and dispatched) to a command buffer for processing by a GPU of the device 105. In some aspects, the device 105 (e.g., the framework backend of the neural network) may dispatch the shader sequences 310 (e.g., shader sequences 310-a through 310-e, and so on) of FIG. 3A into sets of shader dispatches 325. For example, the device 105 may dispatch the shader sequences 310 to a command buffer (e.g., to sets of shader dispatches 325 of the command buffer) based on layer parameters, machine learning operations, or both, of layers 305 corresponding to the shader sequences 310. In an example, the device 105 may dispatch shader sequences 310-a through 310-f to a set of shader dispatches 325-a, dispatch shader sequences 310-g through 310-m to a set of shader dispatches 325-b, dispatch shader sequences 310-n through 310-q to a set of shader dispatches 325-c, and dispatch shader sequences 310-r through 310-x to a set of shader dispatches 325-d. In some aspects, each of the sets of shader dispatches 325 may include a number of threadgroups, where each threadgroup is a group of threads (or slots), and each thread corresponds to one execution of an associated shader. As described herein, flush markers may be inserted (in or after) shader sequences 310-f, 310-m, 310-q, and 310-x illustrated in FIG. 3B, for example, to clear the command buffer (e.g., to clear the command buffer with respect to the sets of shader dispatches 325-a, 325-b, 325-c, and 325-d, respectively).

In some aspects, the device 105 may determine or estimate an execution time associated with executing a shader dispatch, for example, based on layer parameters associated with the shader dispatch. In an example, the device 105 may determine or estimate execution times associated with executing shader dispatches based on layer parameters of the layers 305.

The device 105 may determine a target execution time based on an assembly time associated with the command buffer, a processing time associated with the command buffer, a frequency level associated with the processing of the command buffer (e.g., based on the number of shader sequences 310 processed by the command buffer within a time duration), the layer parameters described herein (e.g., based on layer parameters such as machine learning operations, shader complexity parameters, tensor size parameters, etc.), or a combination thereof. In an example, the device 105 may determine a target execution time associated with executing a set of shader dispatches 325-a based on an assembly time associated with the command buffer, a processing time associated with the command buffer, a frequency level associated with processing of the command buffer, one or more layer parameters associated with layers 305-a through 310-f (layers 305-e and 305-f are not shown) which correspond to the shader sequences 310-a through 310-f, or a combination thereof.

In some aspects, the device 105 may batch the shader dispatches to the command buffer based on, for example, the determined or estimated execution times associated with the shader dispatches. In some other aspects, the device 105 may batch the shader dispatches to the command buffer based on target execution times associated with executing the shader dispatches. In some examples, the device 105 may batch the shader dispatches to the command buffer based on a combination of the determined execution times and the target execution times. In an example, the device 105 may batch a shader dispatch to the command buffer (e.g., batch the shader dispatch to a set of shader dispatches 325) based on a determined or estimated execution time associated with the shader dispatch, a target execution time associated with executing the shader dispatch, or a combination thereof.

The device 105 may flush or clear the command buffer. Flushing the command buffer may include clearing out data accumulated in the command buffer, with or without transferring (e.g., storing) the accumulated data to a memory of the device 105 or a memory coupled to the device 105. In some aspects, shader sequences 320-f, 320-m, 320-q, and 320-x may each include a flush maker (e.g., based on GPU execution times of shader sequences 320-a through 320-f, shader sequences 320-g through 320-m, shader sequences 310-n through 310-q, and shader sequences 310-r through 310-x, respectively). In some aspects, the device 105 may flush the command buffer based on the flush markers and dispatch a new set of shader sequences to the command buffer based on (e.g., after) flushing the command buffer.

In some aspects, the device 105 may flush the command buffer based on processing of the command buffer (e.g., based on processing of a set of shader dispatches 325). In some examples, the device 105 may determine an accumulated execution time for a set of machine learning operations associated with the command buffer (e.g., associated with executing a set of shader dispatches 325) and, in some aspects, flush the command buffer based on determining the accumulated execution time exceeds a maximum execution time threshold. For example, in some cases, the device 105 may determine an accumulated execution time for machine learning operations associated with layers 305-a through 305-f (e.g., machine learning operations associated with the shader sequences 310-a through 310-f), and in some aspects, flush the command buffer based on determining the accumulated execution time exceeds a maximum execution time threshold.

In some examples, the device 105 may flush the command buffer based on one or more flush markers inserted in the shader sequences 310. In some examples, the device 105 may insert flush markers at (e.g., in or after) shader sequence 310-f, shader sequence 310-m, shader sequence 310-q, and shader sequence 310-x, based on the target execution time and the determined execution time of a shader dispatch (e.g., of sets of shader dispatches 325-a through 325-d) associated with the shader sequences 310. For example, the device 105 may insert a flush marker into the shader sequence 310-f based on a difference between the target execution time and the determined execution time(s). In some aspects, the device 105 (e.g., the framework backend of the device 105) may insert the flush markers at layer parsing of the neural network (e.g., at layer parsing of the layers 305).

Examples of aspects of the adaptive dispatch techniques described herein may reduce or eliminate periods where the GPU of the device 105 is idle. For example, the shader dispatch techniques may reduce durations of idle periods 315-a through 315-c between the sets of shader dispatches 325-a through 325-d. The shader dispatch techniques described herein may balance the CPU time associated with assembling the command buffers with the GPU time associated with processing the command buffer, which may reduce durations of or eliminate the idle periods 315-a through 315-c. In some aspects, the shader dispatch techniques may include non-uniform dispatching of shader sequences 310 among the sets of shader dispatches 325. For example, six shader sequences (e.g., shader sequences 310-a through 310-f) may be dispatched to the set of shader dispatches 325-a, and seven shader sequences (e.g., shader sequences 310-g through 310-m) may be dispatched to the set of shader dispatches 325-b, etc.

In some aspects of the adaptive dispatch techniques described herein, the device 105 may calculate a dispatch efficiency associated with the total GPU execution time of shaders that back the neural network (e.g., shaders that back the DNN) and the execution time as measured from the host CPU. The dispatch efficiency may be, for example, a ratio of the total GPU execution time to the execution time as measured from the host CPU. In some aspects, the adaptive dispatch techniques described herein may include assembling (e.g., dispatching) shader sequences to a command buffer, flushing the command buffer, or a combination thereof as described herein, based on the dispatch efficiency (e.g., based on a achieving a dispatch efficiency within a threshold of, for example, a dispatch efficiency of '1').

Figure 4:
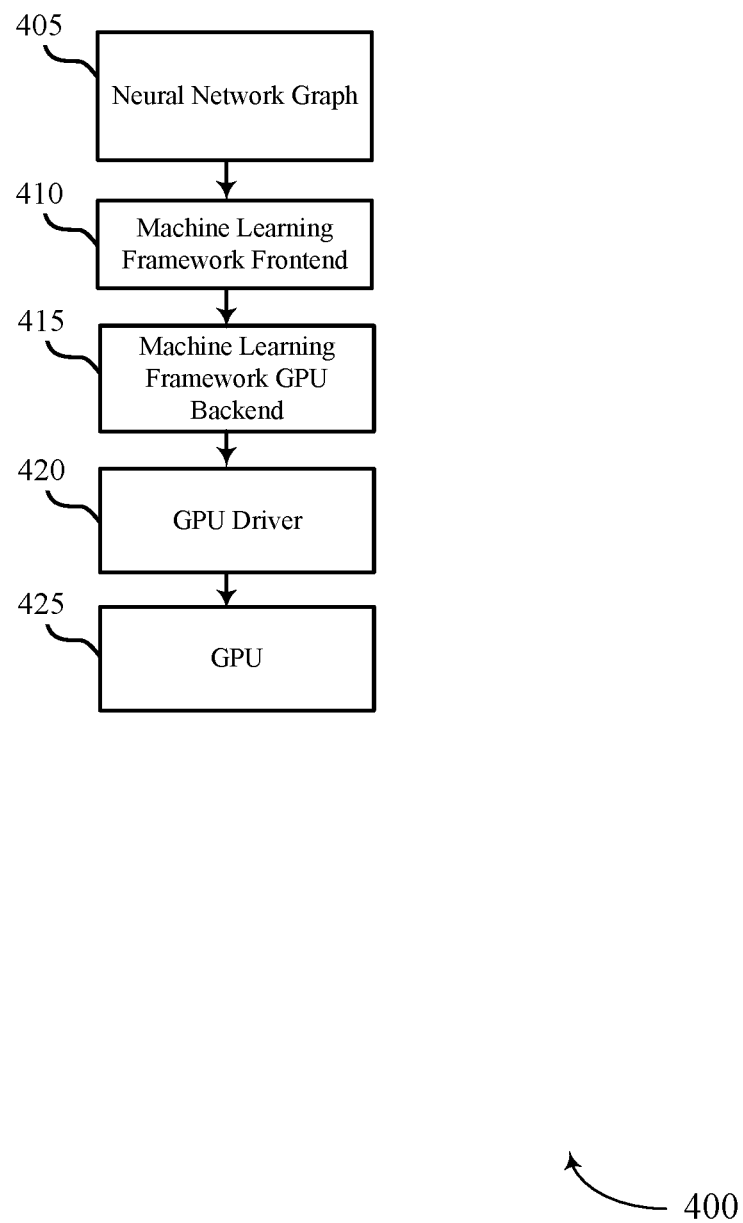
FIG. 4 illustrates an example of a machine learning framework that supports adaptive dispatch for acceleration of neural networks on GPUs in accordance with aspects of the present disclosure.

FIG. 4 illustrates an example of a machine learning framework 400 that supports adaptive dispatch for acceleration of neural networks on GPUs in accordance with aspects of the present disclosure. In some examples, the machine learning framework 400 may implement aspects of multimedia system 100. In some examples, the machine learning framework 400 may implement aspects of the device 105, device 200, dispatch model 300, and dispatch sequence 301 described herein.

The machine learning framework 400 may include a neural network graph 405, a machine learning framework frontend block 410, a machine learning framework GPU backend block 415, a GPU driver 420, and a GPU 425.

The neural network graph 405 may include a graph structure. The graph structure may include one or more graphs (e.g., data structures), each graph being inclusive of components, vertices (nodes) and edges defining aspects of the graph structure. In some example aspects, a neural network (e.g., a deep neural network) as described herein may be configured for operating and learning based on the graph structure. The neural network graph 405 may include a deep neural network graph. The neural network graph 405 may be an example of aspects of the neural networks 150 and 250 described herein.

The machine learning framework frontend block 410 may be configured to read input data. In an example, the machine learning framework frontend block 410 may receive one or more shaders (e.g., shader programs) to be executed or processed by the GPU 425. The shaders, for example, may include compute shaders, pixel shaders, vertex shaders, or a combination thereof. The machine learning framework frontend block 410 may be configured to generate data based on the received shaders. In some aspects, the machine learning framework frontend block 410 may include features for learning (e.g., supervised, unsupervised, or both) based on the received shaders.

The machine learning framework GPU backend block 415 may generate GPU code (e.g., one or more of shader sequences 310) for the GPU driver 420. In some aspects, the machine learning framework GPU backend block 415 may determine an execution time associated with shader sequences (e.g., shader sequences 310) based on layer parameters machine learning operations, tensor size parameters, layer type parameters, shader complexity parameters, etc., or a combination thereof. In some examples, the machine learning framework GPU backend block 415 (e.g., responsible for generating GPU code for the GPU driver 420) may batch shader dispatches to the command processor (e.g., of the GPU driver 420) based on determined execution times and target execution times thereof.

For example, the machine learning framework GPU backend block 415 may generate GPU code for the GPU driver 420 and may batch shader dispatches (e.g., sets of shader dispatches 325) based on determined execution times, target execution times, CPU/GPU balancing, etc. (e.g., as described herein). In some aspects, the machine learning framework GPU backend block 415 may batch the shader dispatches to the command processor such that each shader dispatch may be processed by the GPU 425 within a threshold of a target execution time for each shader dispatch.

Figure 5:
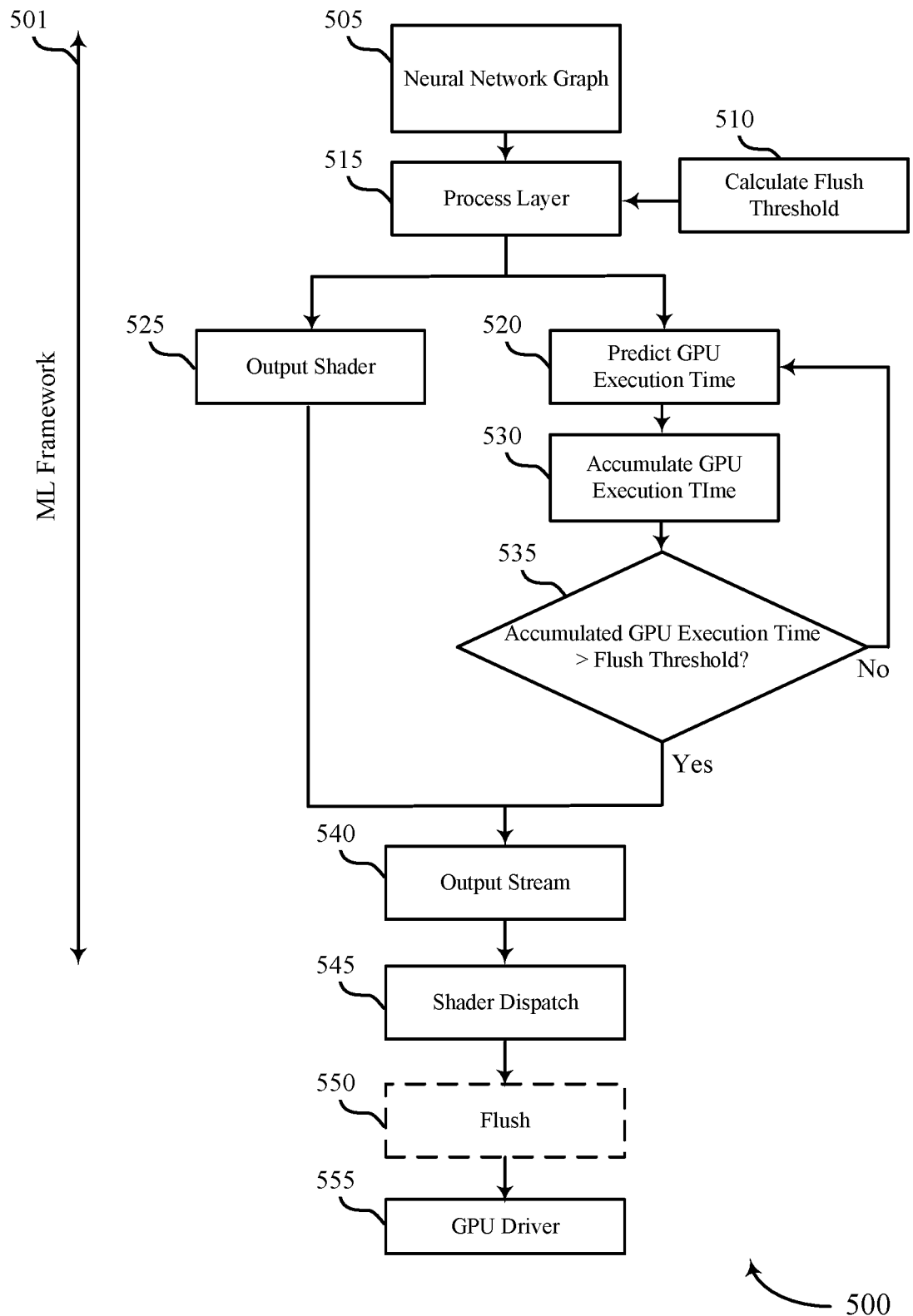
FIG. 5 illustrates an example of a method that supports adaptive dispatch for acceleration of neural networks on GPUs in accordance with aspects of the present disclosure.

FIG. 5 illustrates an example of a method 500 that supports adaptive dispatch for acceleration of neural networks on GPUs in accordance with aspects of the present disclosure. In some examples, the method 500 may implement aspects of multimedia system 100. In some aspects, the method 500 may implement aspects of the device 105, device 200, dispatch model 300, dispatch sequence 301, and machine learning framework 400 described herein.

The method 500 may be implemented by a machine learning (ML) framework 501. The machine learning framework 501 may be configured for implementing 505 through 555 illustrated in the method 500. Examples of aspects of the method 500 are described herein in reference to FIGS. 3A and 3B. In some examples, the machine learning framework 501 may be an example of, or may perform, aspects of machine learning framework frontend block 410 and machine learning framework GPU backend block 415.

At 505, the device 105 may parse layers 305 (e.g., layers 305-a through 305-d) for layer parameters or operations (e.g., machine learning operations) of a neural network 150 (e.g., a deep neural network) of the device 105. The set of layers 305-a through 305-d may be associated with a set of machine learning operations of the neural network 150. In some aspects, the device 105 may parse the layers 305-a through 305-d based on a neural network graph (e.g., a deep neural network graph) as described herein.

At 510, the device 105 may calculate (e.g., pre-calculate) a flush threshold associated with flushing the command buffer. In some aspects, the flush threshold may include a maximum execution time threshold associated with accumulated execution times for machine learning operations (e.g., machine learning operations associated with the set of layers 305-a through 305-d). In some cases, the flush threshold may be calculated based on a target execution time, based on balancing the CPU time involved in assembling command buffers with the GPU time required to process them, etc.

At 515, the device 105 may process the set of layers 305-a through 305-d. For example, at 515, the device 105 may determine to process layers 305-a through 305-d from among the layers 305.

At 520, the device 105 may predict a GPU execution time. For example, the device 105 may determine a GPU execution time associated with executing a shader dispatch, for example, based on one or more layer parameters (e.g., layer parameters associated with the shader dispatch). In an example, the device 105 may determine or estimate GPU execution times associated with executing sets of shader dispatches 325 (e.g., sets of shader dispatches 325-a through 325-d) based on layer parameters of the layers 305, as described herein.

At 525, the device 105 may output (e.g., emit) a shader. For example, the device 105 may output a shader corresponding to the layer processed at 515. In some examples, the device 105 may output a shader (or shaders) corresponding to one or more of the layers 305.

At 530, the device 105 may determine an accumulated execution time (e.g., an accumulated GPU execution time) for a set of machine learning operations associated with a command buffer. For example, the device 105 may determine accumulated execution times (e.g., accumulated GPU execution times) for machine learning operations associated with the command buffer, based on shader dispatches that are batched to the command buffer.

At 535, the device 105 may compare the accumulated execution time(s) (e.g., the accumulated GPU execution time(s)) to the flush threshold calculated (e.g., pre-calculated) at 510. The flush threshold may be associated with a CPU assembly time. In some aspects, where the device 105 determines an accumulated execution time is greater than or equal to the flush threshold (e.g., the device 105 determines the accumulated GPU execution time exceeds or will exceed the CPU assembly time), the device 105 may output a flush marker associated with the accumulated execution time. In some aspects, based on a determination by the device 105 that the accumulated execution time is less than the flush threshold, the device 105 may refrain from outputting a flush marker, and in some examples, return to 520.

At 540, the device 105 may output (e.g., emit) a stream inclusive of shaders output at 525 and flush markers associated with the shaders (e.g., flush markers output at 535).

At 545, the device 105 may batch one or more shader dispatches to a command buffer based on the GPU execution times associated with executing the shader dispatches. For example, the device 105 may batch sets of shader dispatches 325 to the command buffer based on, for example, the GPU execution times associated with executing the sets of shader dispatches 325. In an example, the device 105 may assemble (e.g., dispatch) the sets of shader dispatches 325 to the command buffer based on the GPU execution times associated with executing the sets of shader dispatches 325.

At 550, the device 105 may flush the command buffer based on the flush marker(s) output at 535. In some aspects, the device 105 may flush the command buffer based on flush markers output at 535 and included in the stream output at 540.

At 555, the device 105 (e.g., GPU driver 220, GPU driver 420) may compile layers 305 (e.g., 305-a through 305-d) of the neural network 150. For example, the device 105 may compile machine learning operations associated with layers 305.

As described herein, adaptive dispatch techniques are proposed which are capable of accurately predicting the execution times for shader dispatches. The techniques described herein may include acquiring or determining both shader complexity and global work size of each shader dispatch.

In some aspects, the GPU execution time for each shader may be deterministically calculated at the GPU backend. For example, the GPU backend may determine or identify tensors sizes for each machine learning operation (layer), and in some aspects, determine the global work size of each shader dispatch based on the tensor sizes. In some additional aspects, the GPU backend may determine or identify shader complexity, as each machine learning operation may be backed by a shader.

As described herein, the GPU backend may batch N shader dispatches such that the cumulative execution time for the shader dispatches equals a desired batch time (e.g., a batch time associated with a reducing GPU idle times and processing latency). The desired batch time may be based on, for example, the ratio of CPU and GPU power associated with the device 105.

In some aspects, the techniques described herein may support deterministic calculation of the GPU execution time for each layer in a machine learning model based on, for example, parameters of the layers, operations associated with the layers, tensor sizes associated with the layers, and other layer parameters. Accordingly, the techniques described herein provide for an batching heuristic which may be optimized based on a deterministic knowledge of GPU execution time. In some aspects, the techniques described herein may be implemented with a low level machine learning API, for example, a low level machine learning API having partial network visibility (e.g., that does not have full network visibility). In an example, a low level machine learning API may be configured to perform one or more operations associated with batching shader dispatches (e.g., adaptively determine shader batch sizes) based on determined execution times and target execution times as described herein.

Figure 6:
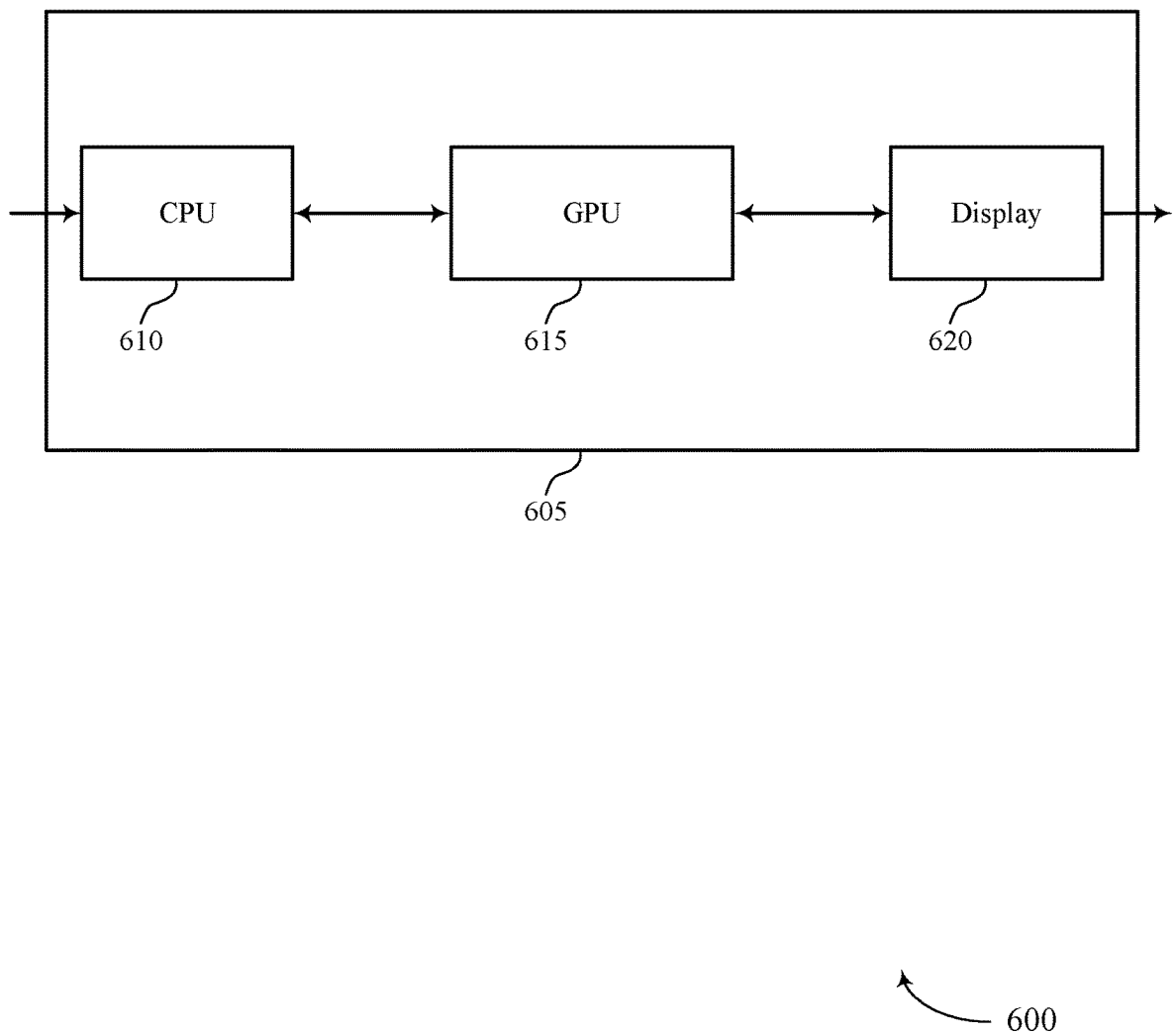
FIGS. 6 and 7 show block diagrams of devices that support adaptive dispatch for acceleration of neural networks on GPUs in accordance with aspects of the present disclosure.

FIG. 6 shows a block diagram 600 of a device 605 that supports adaptive dispatch for acceleration of neural networks on GPUs in accordance with aspects of the present disclosure. The device 605 may be an example of aspects of a device 105 or a device 200 as described herein. The device 605 may include a CPU 610, a GPU 615, and a display 620. The device 605 may also include a general processor. Each of these components may be in communication with one another (e.g., via one or more buses).

CPU 610 may be an example of CPU 210 described with reference to FIG. 2. CPU 610 may execute one or more software applications, such as web browsers, graphical user interfaces, video games, or other applications involving graphics rendering for image depiction (e.g., via display 620). As described herein, CPU 610 may encounter a GPU program (e.g., a program suited for handling by GPU 615) when executing the one or more software applications. Accordingly, CPU 610 may submit rendering commands to GPU 615 (e.g., via a GPU driver containing a compiler for parsing API-based commands).

The GPU 615 may parse a set of layers of a deep neural network, where the set of layers is associated with a set of machine learning operations of the deep neural network, determine one or more layer parameters based on the determined set of layers, determine an execution time associated with executing a shader dispatch based on the one or more layer parameters, batch the shader dispatch to a command buffer based on the execution time, and process the command buffer based on the batching. The GPU 615 may be an example of aspects of the GPU 910 described herein.

The GPU 615, or its sub-components, may be implemented in hardware, code (e.g., software or firmware) executed by a processor, or any combination thereof. If implemented in code executed by a processor, the functions of the GPU 615, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The GPU 615, or its sub-components, may be physically located at various positions, including being distributed such that portions of functions are implemented at different physical locations by one or more physical components. In some examples, the GPU 615, or its sub-components, may be a separate and distinct component in accordance with various aspects of the present disclosure. In some examples, the GPU 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Display 620 may display content generated by other components of the device. Display 620 may be an example of display 245 as described with reference to FIG. 2. In some examples, display 620 may be connected with a display buffer which stores rendered data until an image is ready to be displayed (e.g., as described with reference to FIG. 2). The display 620 may illuminate according to signals or information generated by other components of the device 605. For example, the display 620 may receive display information (e.g., pixel mappings, display adjustments) from GPU 615, and may illuminate accordingly. The display 620 may represent a unit capable of displaying video, images, text or any other type of data for consumption by a viewer. Display 620 may include a liquid-crystal display (LCD), a light emitting diode (LED) display, an organic LED (OLED), an active-matrix OLED (AMOLED), or the like. In some cases, display 620 and an I/O controller (e.g., I/O controller 915) may be or represent aspects of a same component (e.g., a touchscreen) of device 605.

Figure 7:
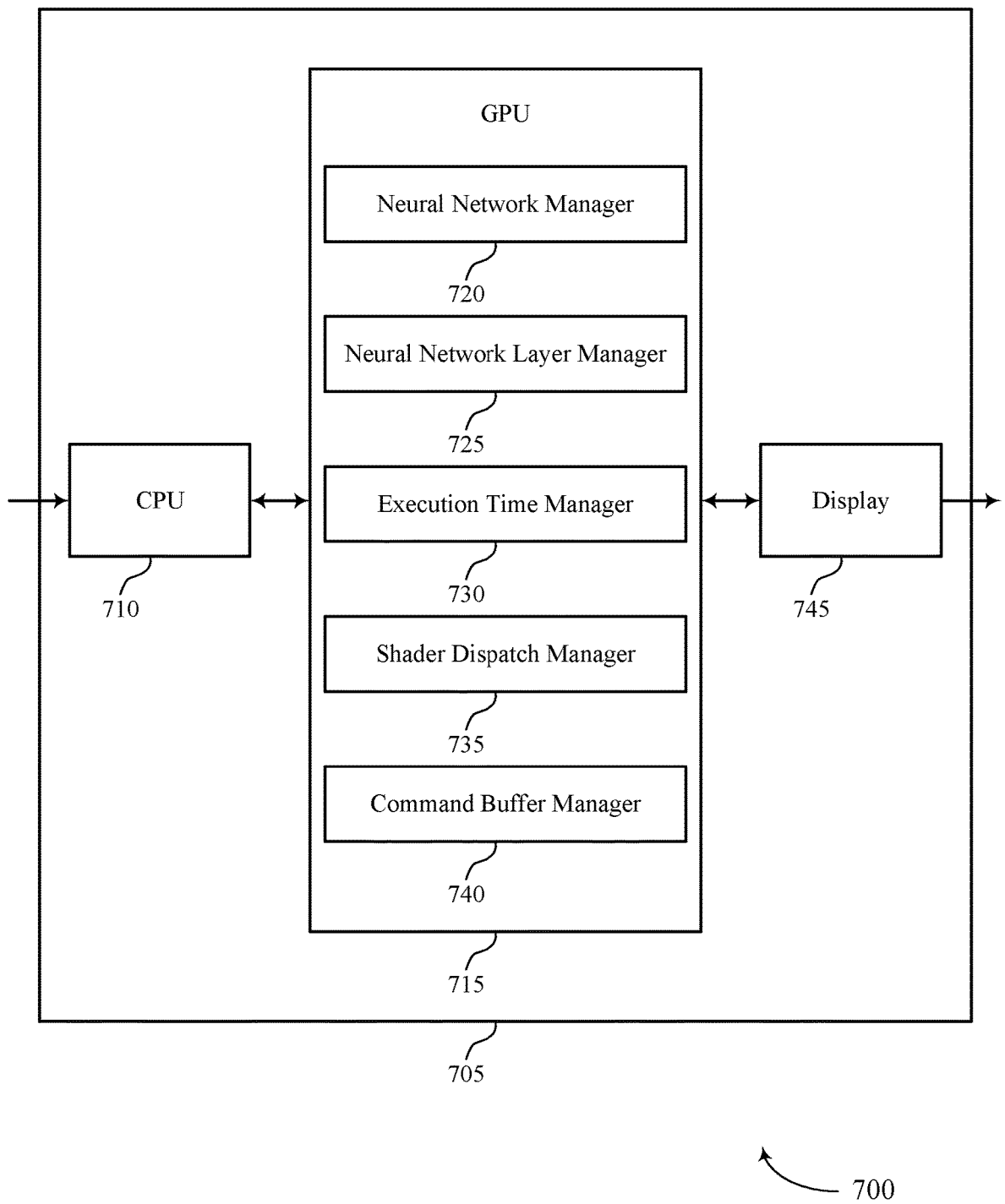

FIG. 7 shows a block diagram 700 of a device 705 that supports adaptive dispatch for acceleration of neural networks on GPUs in accordance with aspects of the present disclosure. The device 705 may be an example of aspects of a device 105, a device 200, or a device 605 as described herein. The device 705 may include a CPU 710, a GPU 715, and a display 745. The device 705 may also include a processor. Each of these components may be in communication with one another (e.g., via one or more buses).

CPU 710 may be an example of CPU 210 described with reference to FIG. 2. CPU 710 may execute one or more software applications, such as web browsers, graphical user interfaces, video games, or other applications involving graphics rendering for image depiction (e.g., via display 745). As described herein, CPU 710 may encounter a GPU program (e.g., a program suited for handling by GPU 715) when executing the one or more software applications. Accordingly, CPU 710 may submit rendering commands to GPU 715 (e.g., via a GPU driver containing a compiler for parsing API-based commands).

The GPU 715 may be an example of aspects of the GPU 615 as described herein. The GPU 715 may include a neural network manager 720, a neural network layer manager 725, an execution time manager 730, a shader dispatch manager 735, and a command buffer manager 740. The GPU 715 may be an example of aspects of the GPU 910 described herein.

The neural network manager 720 may parse a set of layers of a deep neural network, where the set of layers is associated with a set of machine learning operations of the deep neural network. The neural network layer manager 725 may determine one or more layer parameters based on the determined set of layers. The execution time manager 730 may determine an execution time associated with executing a shader dispatch based on the one or more layer parameters. The shader dispatch manager 735 may batch the shader dispatch to a command buffer based on the execution time. The command buffer manager 740 may process the command buffer based on the batching.

Display 745 may display content generated by other components of the device. Display 745 may be an example of display 245 as described with reference to FIG. 2. In some examples, display 745 may be connected with a display buffer which stores rendered data until an image is ready to be displayed (e.g., as described with reference to FIG. 2). The display 745 may illuminate according to signals or information generated by other components of the device 705. For example, the display 745 may receive display information (e.g., pixel mappings, display adjustments) from GPU 715, and may illuminate accordingly. The display 745 may represent a unit capable of displaying video, images, text or any other type of data for consumption by a viewer. Display 745 may include a liquid-crystal display (LCD), a light emitting diode (LED) display, an organic LED (OLED), an active-matrix OLED (AMOLED), or the like. In some cases, display 745 and an I/O controller (e.g., I/O controller 915) may be or represent aspects of a same component (e.g., a touchscreen) of device 705.

Figure 8:
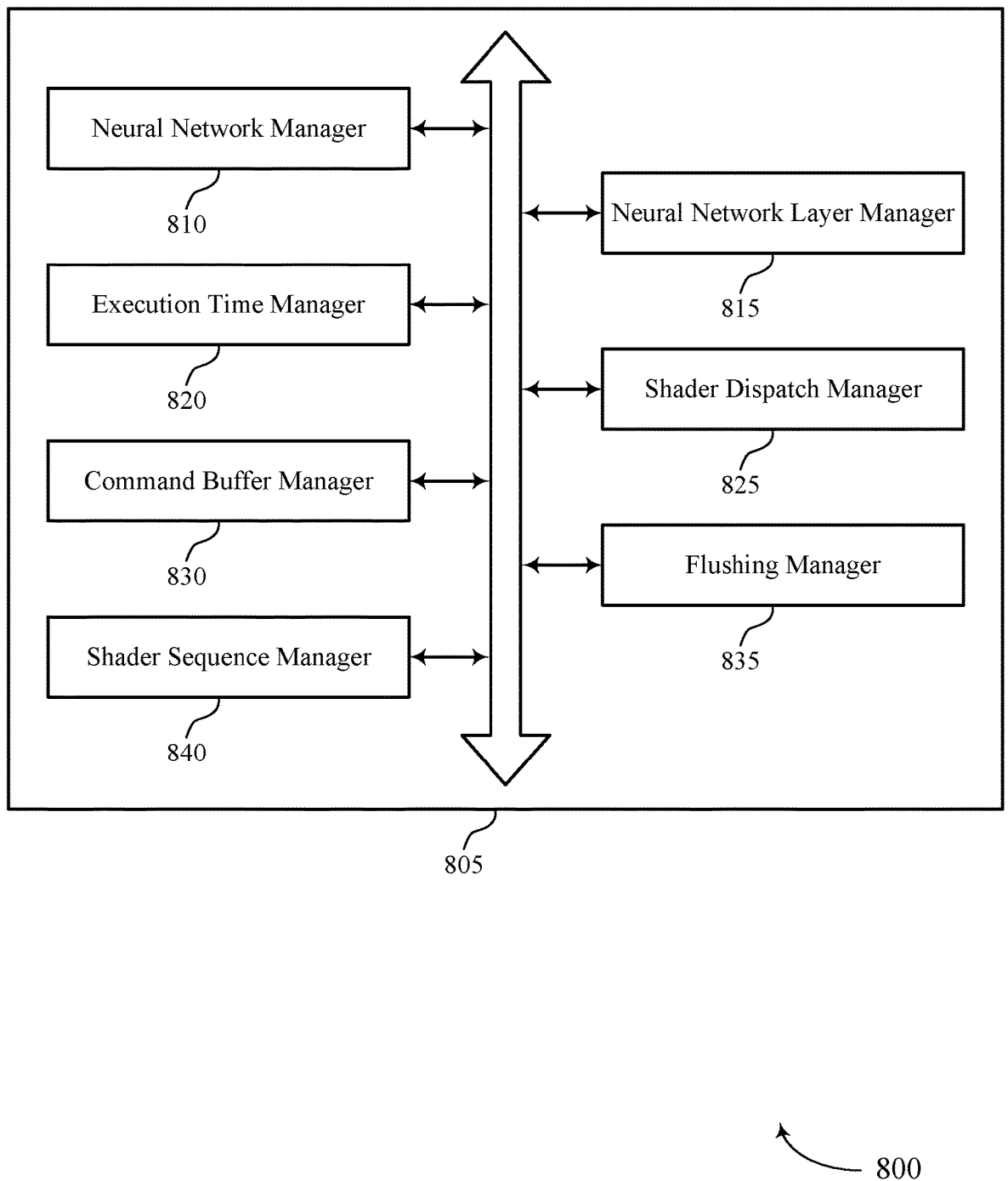
FIG. 8 shows a block diagram of a GPU that supports adaptive dispatch for acceleration of neural networks on GPUs in accordance with aspects of the present disclosure.

FIG. 8 shows a block diagram 800 of a GPU 805 that supports adaptive dispatch for acceleration of neural networks on GPUs in accordance with aspects of the present disclosure. The GPU 805 may be an example of aspects of a GPU 225, a GPU 425, a GPU 615, a GPU 715, or a GPU 910 described herein. The GPU 805 may include a neural network manager 810, a neural network layer manager 815, an execution time manager 820, a shader dispatch manager 825, a command buffer manager 830, a flushing manager 835, and a shader sequence manager 840. Each of these modules may communicate, directly or indirectly, with one another (e.g., via one or more buses).

The neural network manager 810 may parse a set of layers of a deep neural network, where the set of layers is associated with a set of machine learning operations of the deep neural network. The neural network layer manager 815 may determine one or more layer parameters based on the determined set of layers. In some examples, the neural network layer manager 815 may identify a first layer of the set of layers based on the parsing. In some cases, the one or more layer parameters may include one or more tensor size parameters, one or more layer type parameters, one or more shader complexity parameters, or some combination thereof.

The execution time manager 820 may determine an execution time associated with executing a shader dispatch based on the one or more layer parameters. In some examples, the execution time manager 820 may determine a target execution time based on an assembly time associated with the command buffer, a processing time associated with the command buffer, a frequency level associated with the processing of the command buffer, the one or more layer parameters, or some combination thereof.

In some examples, the execution time manager 820 may determine an accumulated execution time for the shader sequence based on at least one layer parameter associated with the first layer, where the shader sequence is dispatched into the set of shader dispatches based on the accumulated execution time. In some examples, the execution time manager 820 may determine an accumulated execution time for the set of machine learning operations. In some examples, the execution time manager 820 may determine the accumulated execution time exceeds a maximum execution time threshold, where the command buffer is flushed based on the determination that the accumulated execution time exceeds the maximum execution time threshold.

In some cases, the shader dispatch may be batched to the command buffer based on the target execution time and the determined execution time associated with the shader dispatch. The shader dispatch manager 825 may batch the shader dispatch to a command buffer based on the execution time. In some examples, the shader dispatch manager 825 may dispatch the shader sequence into a set of shader dispatches, where the set of shader dispatches includes the shader dispatch. The command buffer manager 830 may process the command buffer based on the batching.

The flushing manager 835 may insert a flush marker into a shader sequence based on the target execution time and the determined execution time associated with the shader dispatch, where the shader dispatch is batched to the command buffer based on the flush marker. In some examples, the flushing manager 835 may flush the command buffer based on the processing of the command buffer. In some cases, the command buffer is flushed based on a flush marker in a shader sequence associated with the shader dispatch, the determined execution time associated with the shader dispatch, or both.

The shader sequence manager 840 may determine a shader sequence based on the identified first layer. In some cases, the shader sequence may be dispatched into the set of shader dispatches based on a target execution time for each shader dispatch of the set of shader dispatches.

Figure 9:
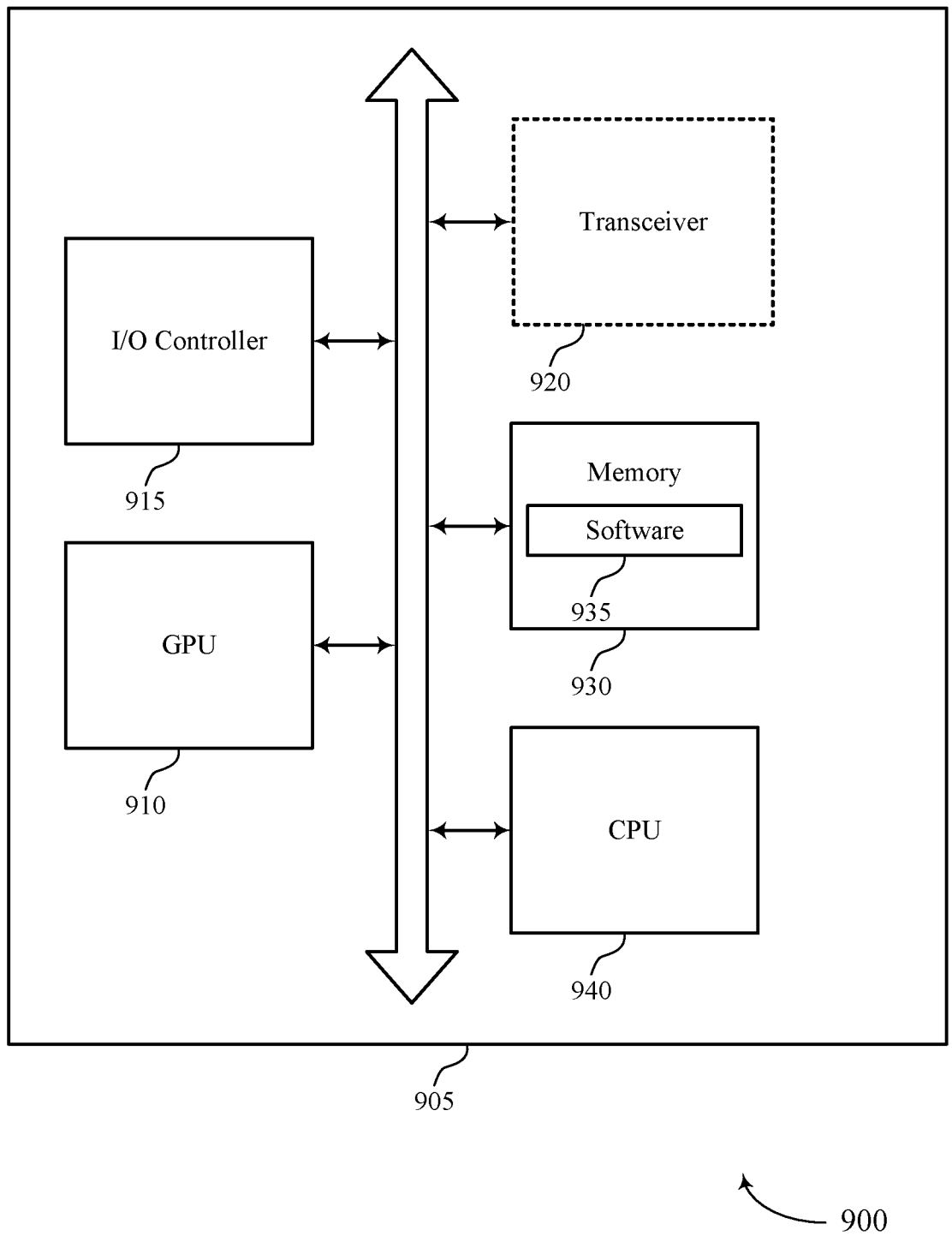
FIG. 9 shows a diagram of a system including a device that supports adaptive dispatch for acceleration of neural networks on GPUs in accordance with aspects of the present disclosure.

FIG. 9 shows a diagram of a system 900 including a device 905 that supports adaptive dispatch for acceleration of neural networks on GPUs in accordance with aspects of the present disclosure. The device 905 may be an example of or include the components of device 105, device 200, device 605, or device 705, as described herein. The device

905 may include a GPU 910, an I/O controller 915, a memory 930, and a processor or CPU 940. In some cases, device 905 may include a transceiver 920. These components may be in electronic communication via one or more buses (e.g., bus 945).

The GPU 910 may parse a set of layers of a deep neural network, where the set of layers is associated with a set of machine learning operations of the deep neural network, determine one or more layer parameters based on the determined set of layers, determine an execution time associated with executing a shader dispatch based on the one or more layer parameters, batch the shader dispatch to a command buffer based on the execution time, and process the command buffer based on the batching.

CPU 940 may include an intelligent hardware device, (e.g., a general-purpose processor, a DSP, a microcontroller, an ASIC, an FPGA, a programmable logic device, a discrete gate or transistor logic component, a discrete hardware component, or any combination thereof). In some cases, CPU 940 may be configured to operate a memory array using a memory controller. In other cases, a memory controller may be integrated into CPU 940. CPU 940 may be configured to execute computer-readable instructions stored in a memory to perform various functions (e.g., functions or tasks supporting dynamic bin ordering for load synchronization).

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915. In some cases, the I/O controller 915 may control or include a display.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

The memory 930 may include RAM and ROM. The memory 930 may store computer-readable, computer-executable code or software 935 including instructions that, when executed, cause the processor to perform various functions described herein. In some cases, the memory 930 may contain, among other things, a BIOS which may control basic hardware or software operation such as the interaction with peripheral components or devices.

In some cases, the GPU 910 and/or the CPU 940 may include an intelligent hardware device, (e.g., a general-purpose processor, a DSP, a microcontroller, an ASIC, an FPGA, a programmable logic device, a discrete gate or transistor logic component, a discrete hardware component, or any combination thereof). In some cases, the GPU 910 and/or the CPU 940 may be configured to operate a memory array using a memory controller. In other cases, a memory controller may be integrated into the GPU 910 and/or the CPU 940. The GPU 910 and/or the CPU 940 may be configured to execute computer-readable instructions stored in a memory (e.g., the memory 930) to cause the device 905 to perform various functions (e.g., functions or tasks supporting adaptive dispatch for acceleration of neural networks on GPUs).

The software 935 may include instructions to implement aspects of the present disclosure, including instructions to support image processing at a device. The software 935 may be stored in a non-transitory computer-readable medium such as system memory or other type of memory. In some cases, the software 935 may not be directly executable by the CPU 940 but may cause a computer (e.g., when compiled and executed) to perform functions described herein.

Figure 10:
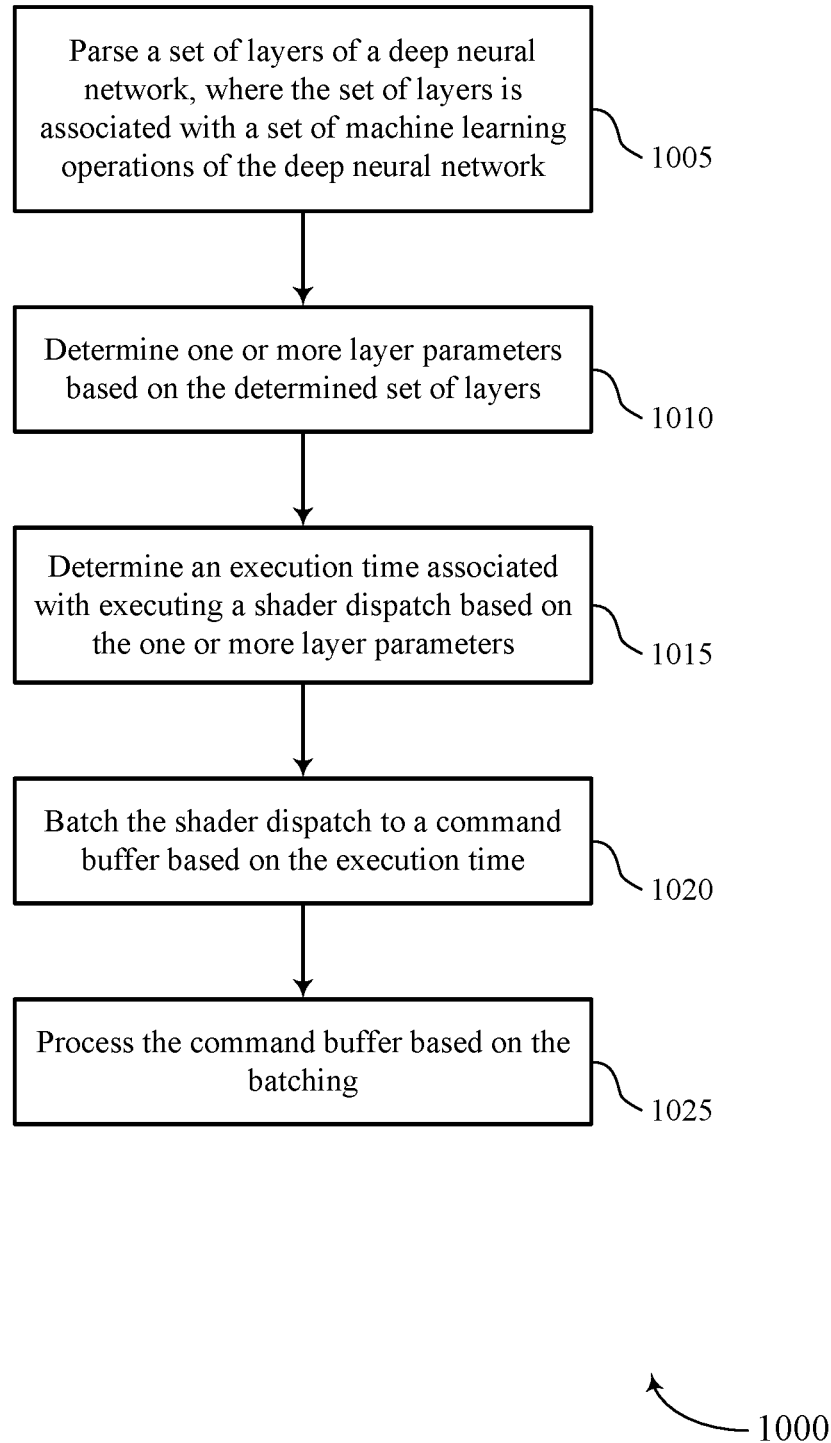
FIGS. 10 and 11 show flowcharts illustrating methods that support adaptive dispatch for acceleration of neural networks on GPUs in accordance with aspects of the present disclosure.

FIG. 10 shows a flowchart illustrating a method 1000 that supports adaptive dispatch for acceleration of neural networks on GPUs in accordance with aspects of the present disclosure. The operations of method 1000 may be implemented by a device or its components as described herein. For example, the operations of method 1000 may be performed by a GPU as described with reference to FIGS. 6 through 9. In some examples, a device may execute a set of instructions to control the functional elements of the device to perform the functions described herein. Additionally or alternatively, a device may perform aspects of the functions described herein using special-purpose hardware.

At 1005, the device may parse a set of layers of a deep neural network, where the set of layers is associated with a set of machine learning operations of the deep neural network. The operations of 1005 may be performed according to the methods described herein. In some examples, aspects of the operations of 1005 may be performed by a neural network manager as described with reference to FIGS. 6 through 9.

At 1010, the device may determine one or more layer parameters based on the determined set of layers. The operations of 1010 may be performed according to the methods described herein. In some examples, aspects of the operations of 1010 may be performed by a neural network layer manager as described with reference to FIGS. 6 through 9.

At 1015, the device may determine an execution time associated with executing a shader dispatch based on the one or more layer parameters. The operations of 1015 may be performed according to the methods described herein. In some examples, aspects of the operations of 1015 may be performed by an execution time manager as described with reference to FIGS. 6 through 9.

At 1020, the device may batch the shader dispatch to a command buffer based on the execution time. The operations of 1020 may be performed according to the methods described herein. In some examples, aspects of the operations of 1020 may be performed by a shader dispatch manager as described with reference to FIGS. 6 through 9.

At 1025, the device may process the command buffer based on the batching. The operations of 1025 may be performed according to the methods described herein. In some examples, aspects of the operations of 1025 may be performed by a command buffer manager as described with reference to FIGS. 6 through 9.

Figure 11:
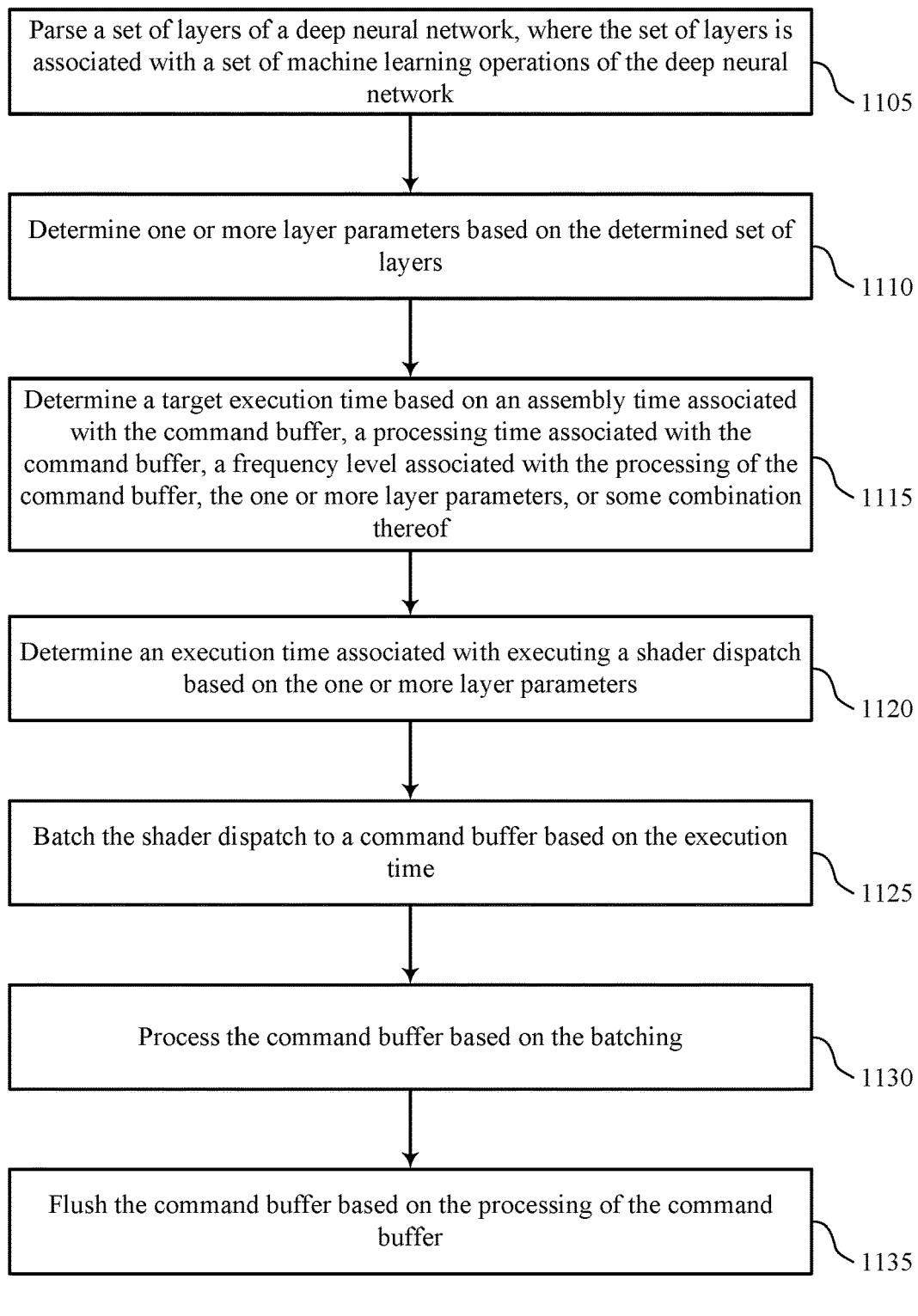

FIG. 11 shows a flowchart illustrating a method 1100 that supports adaptive dispatch for acceleration of neural networks on GPUs in accordance with aspects of the present disclosure. The operations of method 1100 may be implemented by a device or its components as described herein. For example, the operations of method 1100 may be performed by a GPU as described with reference to FIGS. 6 through 9. In some examples, a device may execute a set of instructions to control the functional elements of the device to perform the functions described herein. Additionally or alternatively, a device may perform aspects of the functions described herein using special-purpose hardware.

At 1105, the device may parse a set of layers of a deep neural network, where the set of layers is associated with a set of machine learning operations of the deep neural network. The operations of 1105 may be performed according to the methods described herein. In some examples, aspects of the operations of 1105 may be performed by a neural network manager as described with reference to FIGS. 6 through 9.

At 1110, the device may determine one or more layer parameters based on the determined set of layers. The operations of 1110 may be performed according to the methods described herein. In some examples, aspects of the operations of 1110 may be performed by a neural network layer manager as described with reference to FIGS. 6 through 9.

At 1115, the device may determine a target execution time based on an assembly time associated with the command buffer, a processing time associated with the command buffer, a frequency level associated with the processing of the command buffer, the one or more layer parameters, or some combination thereof. The operations of 1115 may be performed according to the methods described herein. In some examples, aspects of the operations of 1115 may be performed by an execution time manager as described with reference to FIGS. 6 through 9.

At 1120, the device may determine an execution time associated with executing a shader dispatch based on the one or more layer parameters. The operations of 1120 may be performed according to the methods described herein. In some examples, aspects of the operations of 1120 may be performed by an execution time manager as described with reference to FIGS. 6 through 9.

At 1125, the device may batch the shader dispatch to a command buffer based on the execution time. The operations of 1125 may be performed according to the methods described herein. In some examples, aspects of the operations of 1125 may be performed by a shader dispatch manager as described with reference to FIGS. 6 through 9.

At 1130, the device may process the command buffer based on the batching. The operations of 1130 may be performed according to the methods described herein. In some examples, aspects of the operations of 1130 may be performed by a command buffer manager as described with reference to FIGS. 6 through 9.

At 1135, the device may flush the command buffer based on the processing of the command buffer. The operations of 1135 may be performed according to the methods described herein. In some examples, aspects of the operations of 1135 may be performed by a flushing manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for processing at a device, comprising:
    parsing a set of layers of a deep neural network, wherein the set of layers is associated with a set of machine learning operations of the deep neural network;
    determining one or more layer parameters based at least in part on the determined set of layers;
    determining an execution time associated with executing a shader dispatch based at least in part on the one or more layer parameters;
    inserting a flush marker into a shader sequence based at least in part on determining a target execution time and the determined execution time associated with the shader dispatch;
    batching the shader dispatch to a command buffer based at least in part on the execution time, wherein the shader dispatch is batched to the command buffer based at least in part on the flush marker; and
    processing the command buffer based at least in part on the batching.

2. The method of claim 1,
    wherein the target execution time is determined based at least in part on an assembly time associated with the command buffer, a processing time associated with the command buffer, a frequency level associated with the processing of the command buffer, the one or more layer parameters, or some combination thereof.

3. The method of claim 2, wherein the shader dispatch is batched to the command buffer based at least in part on the target execution time and the determined execution time associated with the shader dispatch.

4. The method of claim 1, further comprising:
    identifying a first layer of the set of layers based at least in part on the parsing;
    determining the shader sequence based at least in part on the identified first layer; and
    dispatching the shader sequence into a set of shader dispatches, wherein the set of shader dispatches includes the shader dispatch.

5. The method of claim 4, further comprising:
    determining an accumulated execution time for the shader sequence based at least in part on at least one layer parameter associated with the first layer, wherein the shader sequence is dispatched into the set of shader dispatches based at least in part on the accumulated execution time.

6. The method of claim 4, wherein the shader sequence is dispatched into the set of shader dispatches based at least in part on a target execution time for each shader dispatch of the set of shader dispatches.

7. The method of claim 1, wherein the one or more layer parameters comprise one or more tensor size parameters, one or more layer type parameters, one or more shader complexity parameters, or some combination thereof.

8. The method of claim 1, further comprising:
    flushing the command buffer based at least in part on the processing of the command buffer.

9. The method of claim 8, wherein the command buffer is flushed based at least in part on the flush marker, the determined execution time associated with the shader dispatch, or both.

10. The method of claim 8, further comprising:
    determining an accumulated execution time for the set of machine learning operations; and
    determining the accumulated execution time exceeds a maximum execution time threshold, wherein the command buffer is flushed based at least in part on the determination that the accumulated execution time exceeds the maximum execution time threshold.

11. An apparatus for processing at a device, comprising:
    a processor, memory coupled with the processor; and instructions stored in the memory and executable by the processor to cause the apparatus to:
    parse a set of layers of a deep neural network, wherein the set of layers is associated with a set of machine learning operations of the deep neural network;
    determine one or more layer parameters based at least in part on the determined set of layers;
    determine an execution time associated with executing a shader dispatch based at least in part on the one or more layer parameters;
    insert a flush marker into a shader sequence based at least in part on determining a target execution time and the determined execution time associated with the shader dispatch;
    batch the shader dispatch to a command buffer based at least in part on the execution time, wherein the shader dispatch is batched to the command buffer based at least in part on the flush marker; and
    process the command buffer based at least in part on the batching.

12. The apparatus of claim 11, wherein the target execution time is determined based at least in part on an assembly time associated with the command buffer, a processing time associated with the command buffer, a frequency level associated with the processing of the command buffer, the one or more layer parameters, or some combination thereof.

13. The apparatus of claim 12, wherein the shader dispatch is batched to the command buffer based at least in part on the target execution time and the determined execution time associated with the shader dispatch.

14. The apparatus of claim 11, wherein the instructions are further executable by the processor to cause the apparatus to:
identify a first layer of the set of layers based at least in part on the parsing;
determine the shader sequence based at least in part on the identified first layer; and
dispatch the shader sequence into a set of shader dispatches, wherein the set of shader dispatches includes the shader dispatch.

15. The apparatus of claim 14, wherein the instructions are further executable by the processor to cause the apparatus to:
determine an accumulated execution time for the shader sequence based at least in part on at least one layer parameter associated with the first layer, wherein the shader sequence is dispatched into the set of shader dispatches based at least in part on the accumulated execution time.

16. The apparatus of claim 14, wherein the shader sequence is dispatched into the set of shader dispatches based at least in part on a target execution time for each shader dispatch of the set of shader dispatches.

17. The apparatus of claim 11, wherein the one or more layer parameters comprise one or more tensor size parameters, one or more layer type parameters, one or more shader complexity parameters, or some combination thereof.

18. A method for processing at a device, comprising:
parsing a set of layers of a deep neural network, wherein the set of layers is associated with a set of machine learning operations of the deep neural network;
identifying a first layer of the set of layers based at least in part on the parsing;
determining a shader sequence based at least in part on the identified first layer;
determining one or more layer parameters based at least in part on the determined set of layers;
determining an execution time associated with executing a shader dispatch based at least in part on the one or more layer parameters;
dispatching the shader sequence into a set of shader dispatches, wherein the set of shader dispatches includes the shader dispatch;
batching the shader dispatch to a command buffer based at least in part on the execution time; and
processing the command buffer based at least in part on the batching.

* * * * *